United States Patent
Soscia

[19]

[11] Patent Number: 5,996,893
[45] Date of Patent: Dec. 7, 1999

[54] METHOD AND APPARATUS FOR VISUALLY IDENTIFYING AN AREA ON A PHOTOGRAPH OR IMAGE WHERE DIGITAL DATA IS STORED

[75] Inventor: Peter P. Soscia, Geneseo, N.Y.

[73] Assignee: Eastman Kodak Company, Rochseter, N.Y.

[21] Appl. No.: 08/959,041

[22] Filed: Oct. 28, 1997

[51] Int. Cl.$^6$ ..................................................... G06K 07/10
[52] U.S. Cl. ................................. 235/462.01; 235/472.01
[58] Field of Search ..................................... 235/492, 468, 235/462.01, 462.04, 472.01, 375, 382; 340/825.31, 825.34

[56] References Cited

U.S. PATENT DOCUMENTS

| | | |
|---|---|---|
| 4,189,353 | 2/1980 | Greenaway . |
| 4,505,084 | 3/1985 | Jauch . |
| 4,684,288 | 11/1997 | Renvall ............................... 235/462.01 |
| 4,889,367 | 12/1989 | Miller ....................................... 234/468 |
| 4,943,093 | 7/1990 | Melling et al. . |
| 4,976,456 | 12/1990 | Jack . |
| 4,983,817 | 1/1991 | Dolash et al. ........................... 235/468 |
| 5,369,261 | 11/1994 | Shamir . |
| 5,388,862 | 2/1995 | Edwards . |
| 5,436,974 | 7/1995 | Kovanen . |
| 5,449,200 | 9/1995 | Andric et al. . |
| 5,451,760 | 9/1995 | Renvall ............................... 235/462.01 |
| 5,502,304 | 3/1996 | Berson et al. . |
| 5,597,995 | 1/1997 | Williams et al. ....................... 235/375 |
| 5,611,575 | 3/1997 | Petrie . |
| 5,644,557 | 7/1997 | Akamine et al . |
| 5,677,770 | 10/1997 | Ohori ...................................... 358/296 |
| 5,760,382 | 6/1998 | Li et al. ................................... 235/436 |
| 5,861,618 | 1/1999 | Berson ................................... 235/468 |

OTHER PUBLICATIONS

Soscia et al., "Method and apparatus for producing image prints with variable data encodement", USSN 18/931,575 ( Attorney Docket No. 75689), filed 9/16/97.

*Primary Examiner*—Thien Minh Le
*Attorney, Agent, or Firm*—Walter S. Stevens

[57] ABSTRACT

Methods and apparatus for generating images and/or photographs from digital data files with data, e.g., audio data, stored on the photograph are described. Ink which is invisible or almost invisible to the human eye but which can be detected using an optical reader is used for printing the data on the photograph. When the ink used for printing audio data is slightly noticeable to a human, the color or colors of the photo are adjusted to mask the visual effect of the ink. In order to identify the presence and/or location of printed audio data, the audio data region on the photograph is identified using a non-destructive technique. In one embodiment, the optical density of all or a portion of the image area corresponding to the audio data region of a photograph is reduced slightly from that of the original image to identify the presence and location of the printed audio data. This approach identifies the presence and location of audio data without destroying the content of the image on which the audio data is printed. In another embodiment, audio data markers, e.g., in the form of small lines or marks, are printed on the photograph to identify the presence and/or location of printed audio data. To avoid destroying the image content of the photograph the audio data region identification marks may be printed on the edges or boarder of the photograph. The audio data may be read and played using a hand held scanner.

23 Claims, 7 Drawing Sheets

METHOD AND APPARATUS FOR VISUALLY IDENTIFYING AN AREA ON A PHOTOGRAPH OR IMAGE WHERE DIGITAL DATA IS STORED

FIELD OF THE INVENTION

The present invention relates to image and/or photograph generation and, more particularly, to methods and apparatus for generating images and/or photographs with data, e.g., audio data, stored on the image and/or photograph.

BACKGROUND OF THE INVENTION

As the price of digital cameras continues to decrease, they are becoming ever more popular. Many digital still cameras have the capability of recording audio signals as well as a digital image. The recording of audio sounds, e.g., music at a wedding, is often optional. When audio signals are recorded, they are normally saved within the camera in a digital audio file which is associated with one of the digital image files also stored in the camera. Alternatively, the audio and associated image data may be stored in a single file with the audio and/or video data being identified by a file header.

Thus, for each optical image captured by a digital camera, audio data may, optionally, be associated therewith.

Digital audio and image files generated using a digital camera can, and often are, downloaded to a computer system capable of displaying the image files and playing the audio files. In addition, many computer systems include image processing and printing capabilities.

Unfortunately, at the present time, known systems do not provide a satisfactory way of storing recorded audio information, associated with a photograph, directly on the photograph.

In view of the above, it is apparent that there is a need for methods and apparatus which will allow the storing of audio data directly on a printed photograph. It is desirable that any such methods do not significantly interfere with the quality of the printed image or block out portions of the image. In addition, it is desirable that it be relatively easy for a person to visually detect the presence or absence of audio data on a photograph. It is also desirable that a person be able to visually identify the region of a printed image or photograph where the audio data is stored, e.g., to facilitate the reading back and playing of the audio data via, e.g., the use of a hand held scanner.

SUMMARY OF THE INVENTION

The present invention relates to methods and apparatus for generating images and/or photographs from digital data files with data, e.g., audio data, stored on the image or photograph.

In accordance with the present invention, audio data is stored, e.g., recorded, on a printed image or photograph by printing thereon a series of marks which can be optically detected and converted back into digital data representing, e.g., audio information and/or other information, e.g., creation date/time information, etc. In one embodiment, a bar code type series of lines of varying thickness and/or spacing is used to represent the digital audio data.

While the methods and apparatus of the present invention are suitable for use when generating a hard copy from any image or photograph data file, for purposes of brevity, the present invention will be explained in the context of printing a photograph.

So that the audio data printed on a photograph in accordance with the present invention does not degrade the visual image quality of the photograph or block out portions of the image, in one embodiment, the audio data is printed using ink which is not visually detectable by the human eye but which can be detected using an optical reader.

In another embodiment where the ink may be slightly noticeable to a human, e.g., the printing of the ink used to represent audio data will have a slight effect on the perceived color of portions of photographs over which the audio data is printed, the color or colors of the photograph are adjusted to mask the effect of the ink used to print the audio data.

Normally the audio data printed on the image or photograph will cover only a small portion of the image or photograph. The area on a photograph in which the audio data is printed is referred to herein as the audio data region.

In order to facilitate the reading back of stored audio data, it is desirable that the audio data region of a photograph be visually identified. The identifying of the audio region facilitates subsequent placement of a scanner when reading the stored data and avoids the need for a playback device to scan the entire image to read back the audio data and/or other recorded information.

In one embodiment of the present invention, the audio data region is identified by subtly modifying the image area of the photograph where the audio data is stored. In such an embodiment, the photographic content in the audio data region is modified to render the region visibly identifiable without destroying the photographic content printed in the audio data region. In one particular implementation, this is done by modifying the optical density of the photograph in the audio data region, e.g., to lighten the region by a small amount such as 2–5%.

In another embodiment, the audio data region of a photograph is marked by placing visual markers in a boarder region around the image being printed. In one embodiment this involves placing white boxes in a black boarder to identify the area within the image where the audio data is stored. In another embodiment this involves placing, e.g., small black lines, on a white border placed around the photograph.

The visual indicia of stored audio data added to a photograph in accordance with the present invention make it easy to detect the presence and location of otherwise invisible printed data on a photograph or printed image.

In addition to the above described embodiments and features, numerous additional features, embodiments and advantages of the methods and apparatus of the present invention are discussed below.

DETAILED DESCRIPTION OF THE INVENTION

As discussed above, the present invention is directed to methods and apparatus for generating images and/or photographs with data, e.g., audio data, stored on the image and/or photograph.

Figure 1:
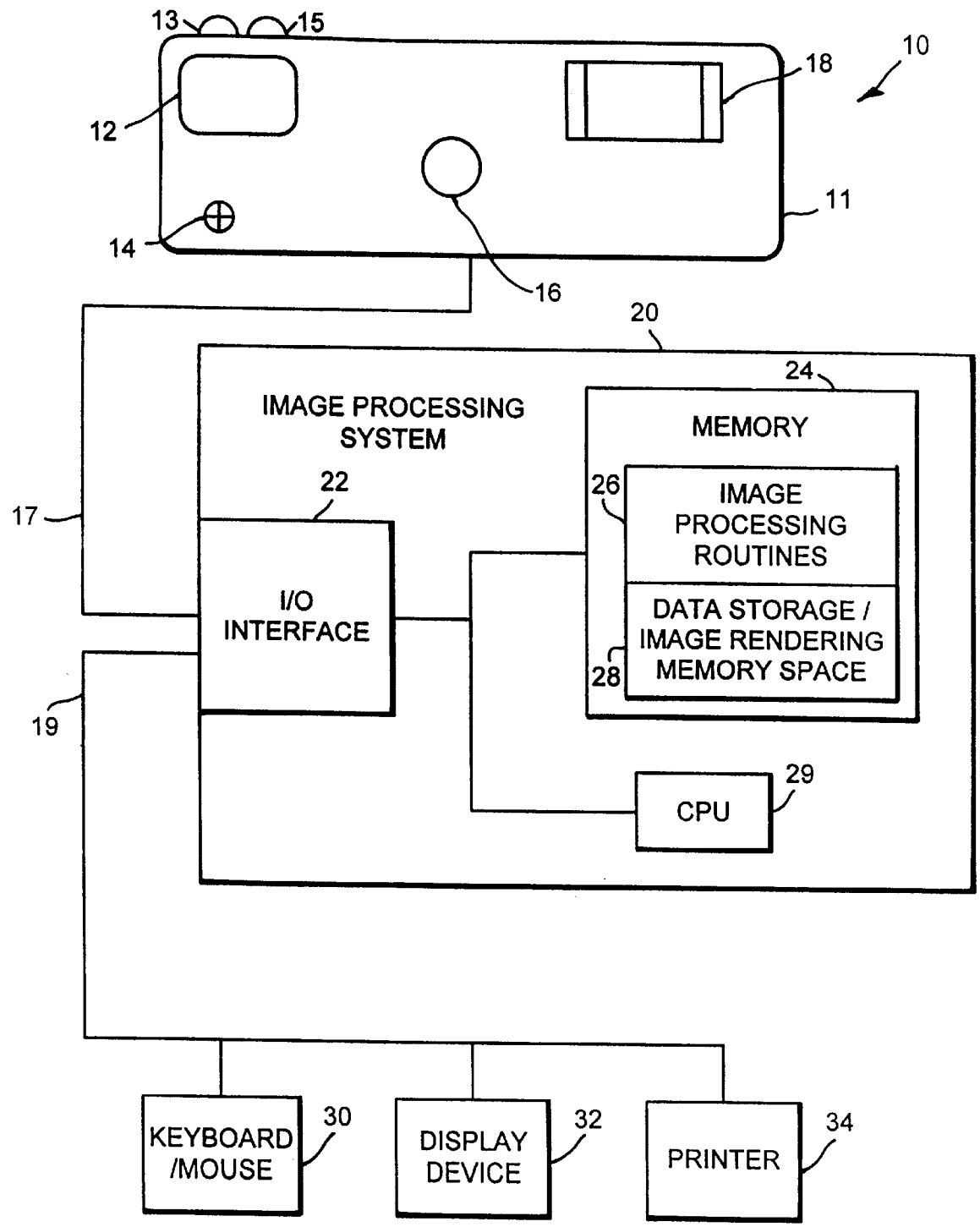
FIG. 1 illustrates a photographic system implemented in accordance with the present invention.

FIG. 1 illustrates a system, generally indicated by the reference numeral 10, suitable for implementing the method of the present invention. The system 10 includes a digital camera 11, an image processing system 20 and input/output devices in the form of a keyboard/mouse 30, a display device 32 and a printer 34. The display device 32 may be a color monitor while the printer 34 may be any one of a plurality of known digital printers capable of printing on a substrate, e.g, paper. While the printer 34 is illustrated as a single printer, it is to be understood that it may comprise one or more printers, e.g., with each printer being responsible for printing a different color and one printer being responsible for printing the audio data using what is referred to as "invisible" ink. The invisible ink is a color agent that, for the most part, does not absorb or fluoresce light in the human visible spectrum but which is, nevertheless, visible to optical reading machines. In one embodiment, the ink used to print the audio data is invisible to the naked eye but can be excited by ultra violet light. Examples of invisible ink suitable for printing the audio data include ink that is based on organic complexes of, rare earth elements ions (lanthanides), such as: europium, gadolinium and terbium dipicolinates. The printer used to apply the invisible ink may be a conventional printer, e.g., ink jet, dot matrix, impact, etc.

The digital camera 11 includes a flash unit 18, a viewing lens or digital image display area 12, a lens 16 for receiving light from the image to be photographed, and a flash unit 18. In addition, the digital camera 11 includes a microphone 14 used for recording audio data and first and second switches in the form of buttons 13, 15. The first switch 13 is used to control the recording of audio data while the second switch 15 is to control the taking of a picture. Audio data which is recorded at the time a picture is taken is stored in an audio data file and associated with a digital image data file. The data in the digital image data file represents the picture taken during the audio recording time period. The size of each created audio data file is a function of the duration of the audio recording that is made by controlling the switch 13.

In the illustrated embodiment, the camera 11 is illustrated as being coupled, via a bus 17, to an input/output (I/O) interface of the image processing system 20. Via the bus 17, which may be coupled to the camera 11 via a interface terminal, digital audio and image data files can be downloaded from the camera 11 to the image processing system 20.

The image processing system 20 of the present invention comprises the I/O interface 22, a central processing unit (CPU) 29 and a memory device 24. The I/O interface 22 is responsible for interfacing the various components of the image processing system 20 to the digital camera 11 and the various input/output devices 30, 32, 34 coupled to the image processing system 20.

The memory 24 includes one or more image processing routines 26 implemented in accordance with the present invention. The image processing routines 26 are used to control the CPU 29 when processing data files representing photographs and the audio files associated therewith.

In addition to the image processing routines 26, the memory 24 includes an area 28 used for storing audio and image data received from the camera 11, and for storing data files representing rendered images. A rendered image is an image data file which has been processed and formatted for printing. A rendered image may comprise a plurality of two dimensional data sets, each data set corresponding to a different color to be rendered. In the case where audio data is to be printed using an invisible ink, the invisible ink is treated as an additional color to be rendered. Accordingly, in rendering color images with which an audio data file is associated, the CPU 29 will generate from the data received, e.g., from the camera 11, a separate data file corresponding to each of the colors cyan, magenta, and yellow (assuming use of a CMY color space) or red, green and blue (assuming use of an RGB color space), in addition to a data file corresponding to the invisible ink to be used to print the audio data on the photograph.

Figure 2:
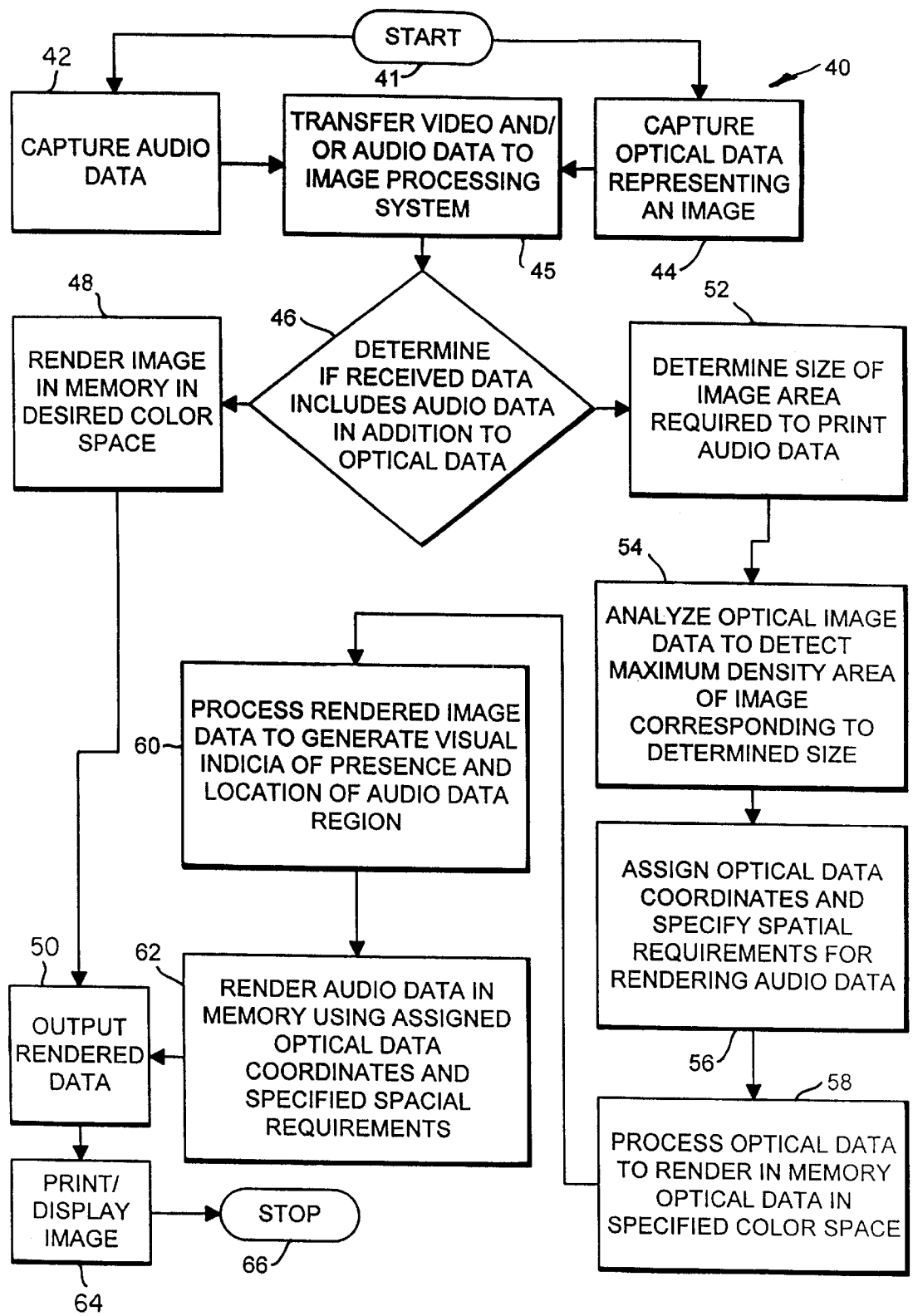
FIG. 2 is a flow chart illustrating the steps of a image generation routine implemented in accordance with the present invention.

Referring now to FIG. 2, the steps of an image generation routine 40 implemented in accordance with an exemplary embodiment of the present invention are illustrated. The steps illustrated in FIG. 2 may be performed by various components of the system illustrated in FIG. 1 including the digital camera 11 and CPU 29.

Figure 3:
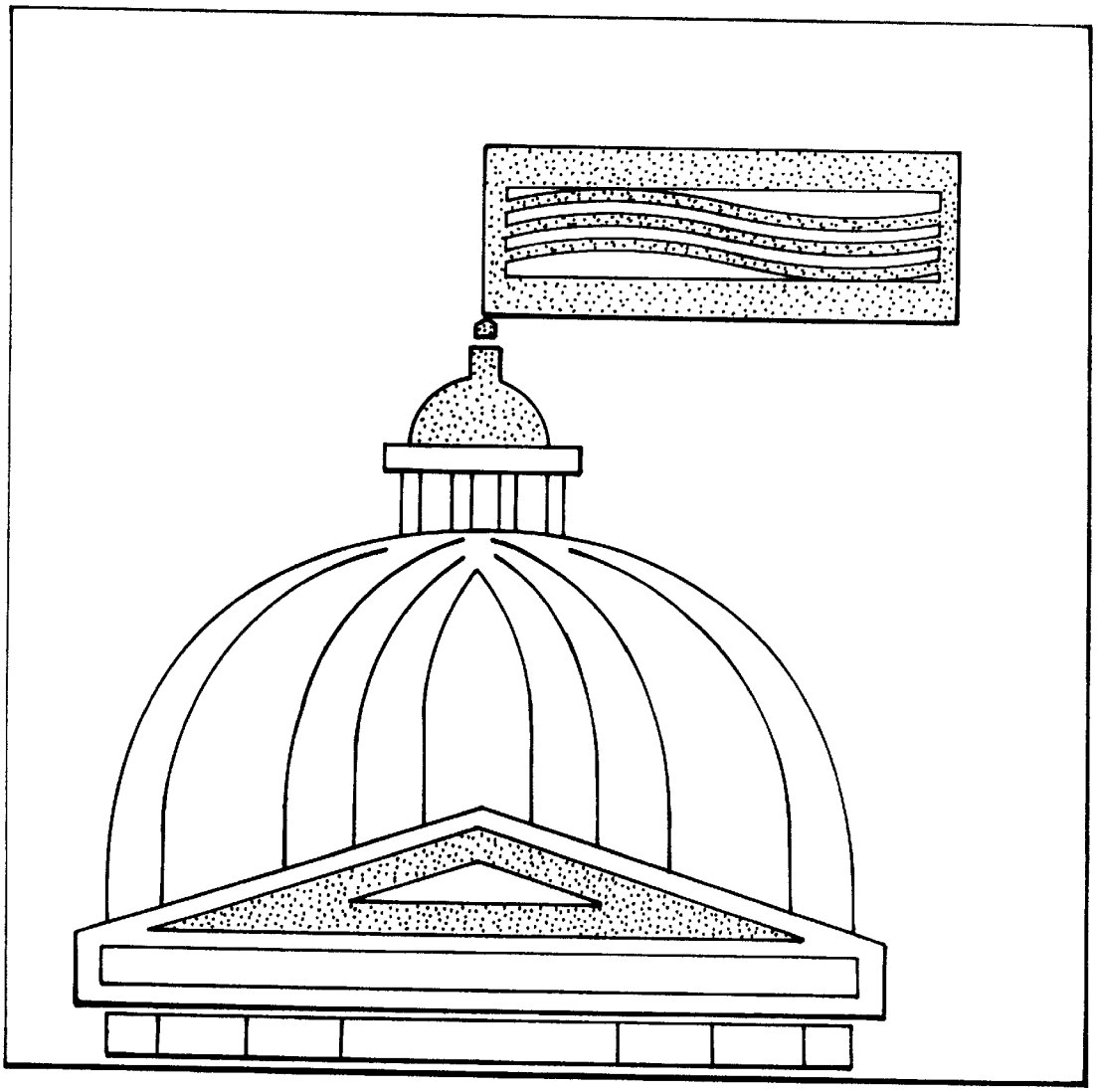
FIG. 3 illustrates a photographic image which can be captured and represented as a digital data file.

The routine 40 begins in step 41 wherein the routine is initiated. Operation progresses to steps 42 and 44 wherein audio data and optical data is captured, respectively. Steps 42 and 44 may be performed in parallel by the digital camera 11 illustrated in FIG. 1. FIG. 3 illustrates an image which can be captured and represented as an optical data file, e.g., by performing step 44.

From steps 42 and 44, operation proceeds to step 45 wherein the optical data captured by the camera 11 and the captured audio data associated with the optical data, if any, are transferred to the memory 24 of the image processing system 20.

After the transfer of data to be processed to the memory 24, in step 46 a determination is made by the image processing system to determine if audio data was received in addition to image processing data. This determination may be made by, e.g., examining a header included in a received data file to determine if it includes audio data in addition to optical data or, alternatively, determining if separate optical and audio data files were received from the digital camera 11.

In step 46, if it is determined that optical data was received without associated audio data, operation proceeds to step 48 wherein the received optical image data is rendered in memory, as is known in the art, in the desired color space, e.g., CMY or RGB. As part of the rendering process, the optical data is processed to form a separate set of two dimensional data for each of the colors to be printed. In the case where image rendering is performed in step 48, no audio data needs to be printed on the photograph being generated. Accordingly, in step 48 three distinct sets of color printing data, each representing a two dimensional array of color printing information, will be generated.

From step 48, operation proceeds to step 50 wherein the rendered data, in the form of data files corresponding to each color to be printed, are sent from the portion 28 of memory where they are stored prior to being supplied to the printer, e.g., via bus 19.

If in step 46 it was determined that audio data was received in addition to optical data, e.g., the header of a received data file indicates the presence of both audio and optical data in the file or an audio data file was received in addition to an optical data file, operation proceeds from step 46 to step 52.

In step 52 a determination is made, e.g., by the CPU 29, as to the size of the image area to be used to store the audio data on the photograph in printed form. Accordingly in step 52 the size of the audio data region is determined. Normally the size of the audio data region will correspond to, or be approximately the size of, the minimum area which can be used to store the contents of the received audio data file. The size of the audio data area may be determined, e.g., by dividing the amount of the received audio data, e.g., in kilobytes (KB) by the data density, e.g., (KB/sq. inch) at which the audio data is to be printed on the photograph. However, it can be made larger than the minimum size required. For example, if pre-selected unit sizes, e.g., ½ square inch blocks, representing fixed units of data are used when determining the size of the audio data region, the audio data region would be selected to match the smallest multiple of the fixed size units that could accommodate the recording of the audio data.

Once the size of the audio data region is determined, the image, represented by the received optical data, is analyzed. In one embodiment, the analysis is performed to detect an image area of the determined size, in the image or photograph to be printed, which has the highest optical density, e.g., average optical density. In this manner, a relatively dark region of the image, matching the size of the audio data region, is identified for use in printing of the audio data.

As discussed above, the ink used to print the audio data is invisible, or mostly invisible, to the human eye. Unfortunately, depending on the ink used for printing the audio data, it may not be completely invisible. In fact, the printing of the dye to store the audio information may slightly impact the perceived color of the underlying image over which the ink is printed. By selecting a dark or relatively dark region of the image being printed to be used as the audio data region, the visible impact of the ink used to print the audio data can be minimized.

Once the area to be used for recording the optical data has been determined, e.g., selected in step 54 by performing the optical data analysis, operation proceeds to step 56. In step 56 optical data coordinates, i.e., two dimensional data coordinates corresponding to an area of the image to be printed, are assigned for the recording of the audio data on the photograph being printed. In addition, the spatial requirements for rendering the audio data are specified, e.g., a two dimensional point in the photograph being printed is assigned for the position of one of the corners of the audio data region and the overall size and shape of the audio data region on the photograph is specified.

Figure 4:
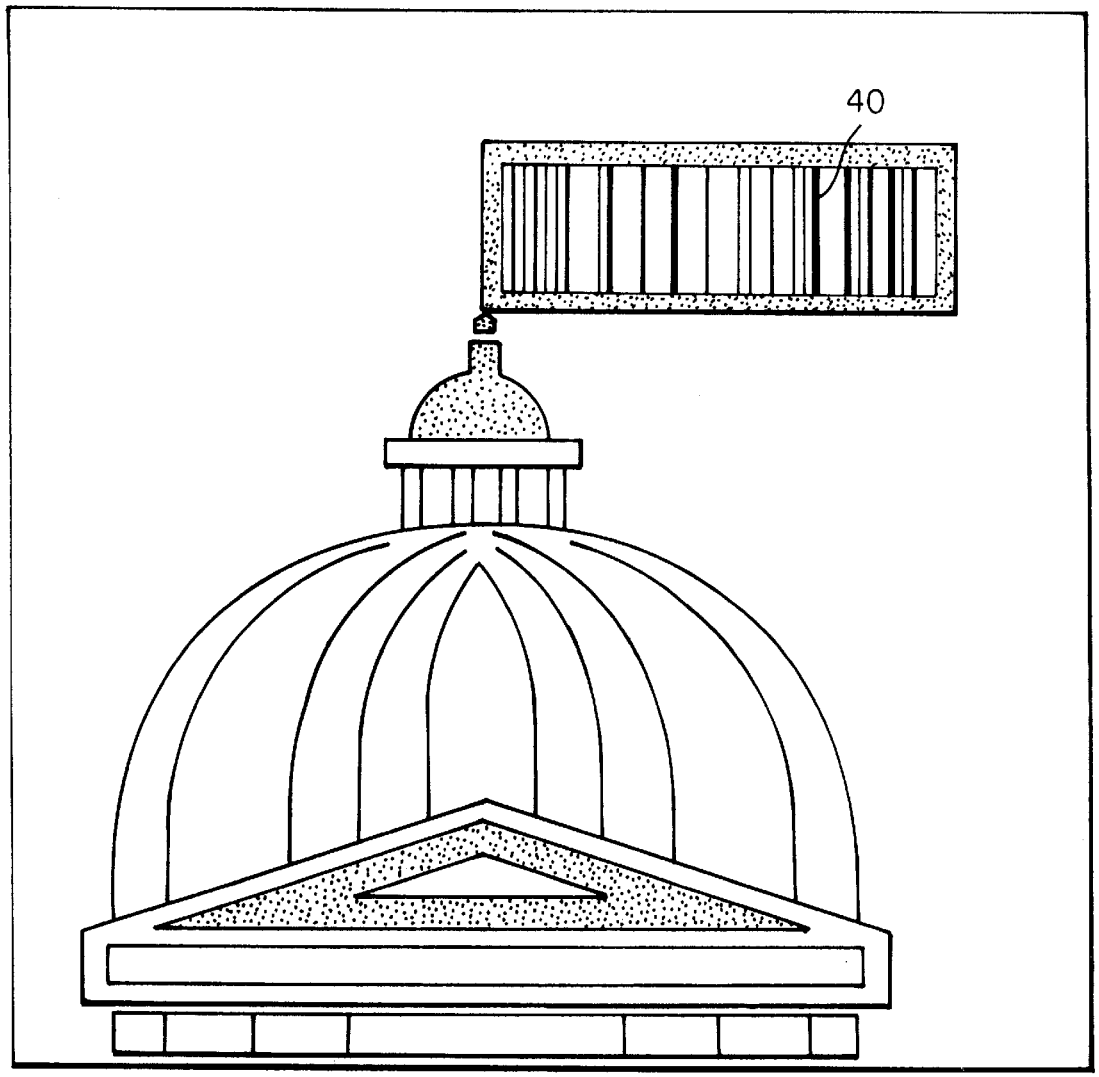
FIG. 4 illustrates the photographic image shown in FIG. 3 with an audio data file printed thereon.

Referring now to FIG. 4, there is illustrated the image of FIG. 3 with audio data printed thereon in the form of a bar code 40 located towards the upper right portion of the photograph. While the bar code 40 is printed using visible ink in FIG. 4, in accordance with the present invention it would normally be printed using invisible ink. The area, in which the bar code 40 is located is the region which is specified in step 56.

From step 56 operation proceeds to step 58 wherein the optical data received in step 45 is processed to render the data suitable for outputting, e.g., to a printer. In this step the received optical image data is rendered in memory in the desired color space, e.g., CMY or RGB. As part of the rendering process, the optical data for each color to be output is processed to form a separate set of two dimensional data. Accordingly, in step 58 three distinct sets of color data, each representing a two dimensional array of information, e.g., printing information, is generated when preparing color image data to be output. In step 58, the rendering process may include adjusting the intensity of the individual colors being rendered in the audio data region to compensate for any effect that printing of the audio data over the color image may have on the colors as they are perceived by a person viewing the photograph. Since the ink used for printing the audio data will normally have been selected prior to performing step 58, its perceived effect, if any, on the colors being printed will normally be known from prior empirical tests and/or general printing knowledge. This makes the modification of the colors in the audio data region to conceal the effect of the printed audio data possible.

In step 60, the sets of optical image data rendered in memory during step 58 are further processed to suitably identify the presence and/or location of audio data in the photograph being printed.

In a first embodiment, the presence and location of audio data is identified by reducing the optical density of the image in the audio data region. This involves, e.g., decreasing the optical density of each of the 3 rendered color image sets by a subtle but visually identifiable amount, e.g., 2–3% in the audio data region defined in step 56. In this manner, the photograph generated will have an easy to identify audio data recording while the integrity of the photograph is maintained since all the image data is displayed and visible.

Figure 5:
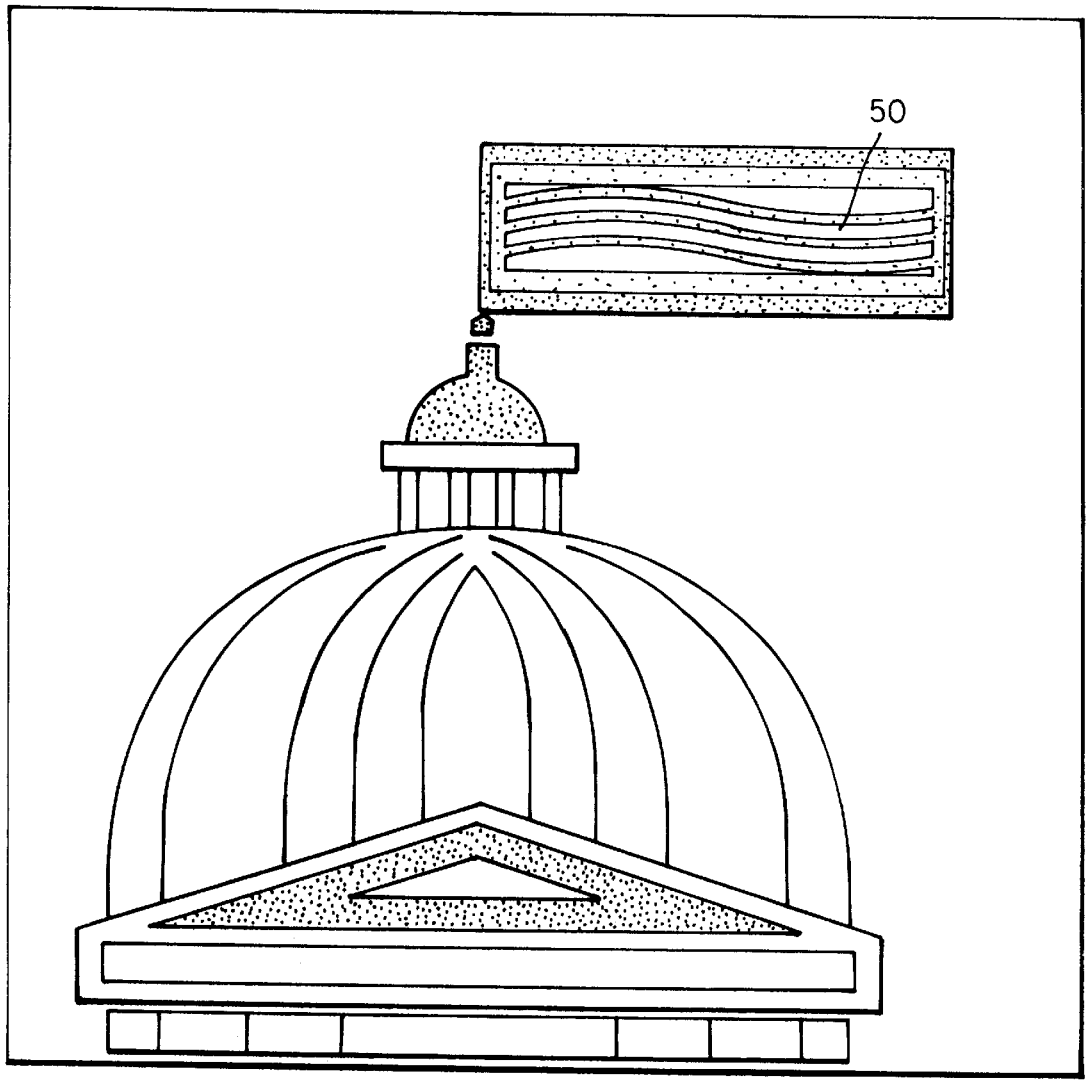
FIG. 5 illustrates a printed photograph generated in accordance with a first embodiment of the present invention wherein an audio data region on the photograph is identified by modifying the optical density of the audio data region.

FIG. 5 illustrates the image of FIG. 3, after it is printed in accordance with the method of the present invention which involves modifying the optical density of the audio data region 50 to identify the presence and location of printed audio data. Note that in FIG. 5, the printed audio data is invisible. However, the audio data region 50 located in the upper right portion of FIG. 5 is readily identifiable as the light area of the image, i.e., the area within the flag.

Figure 6:
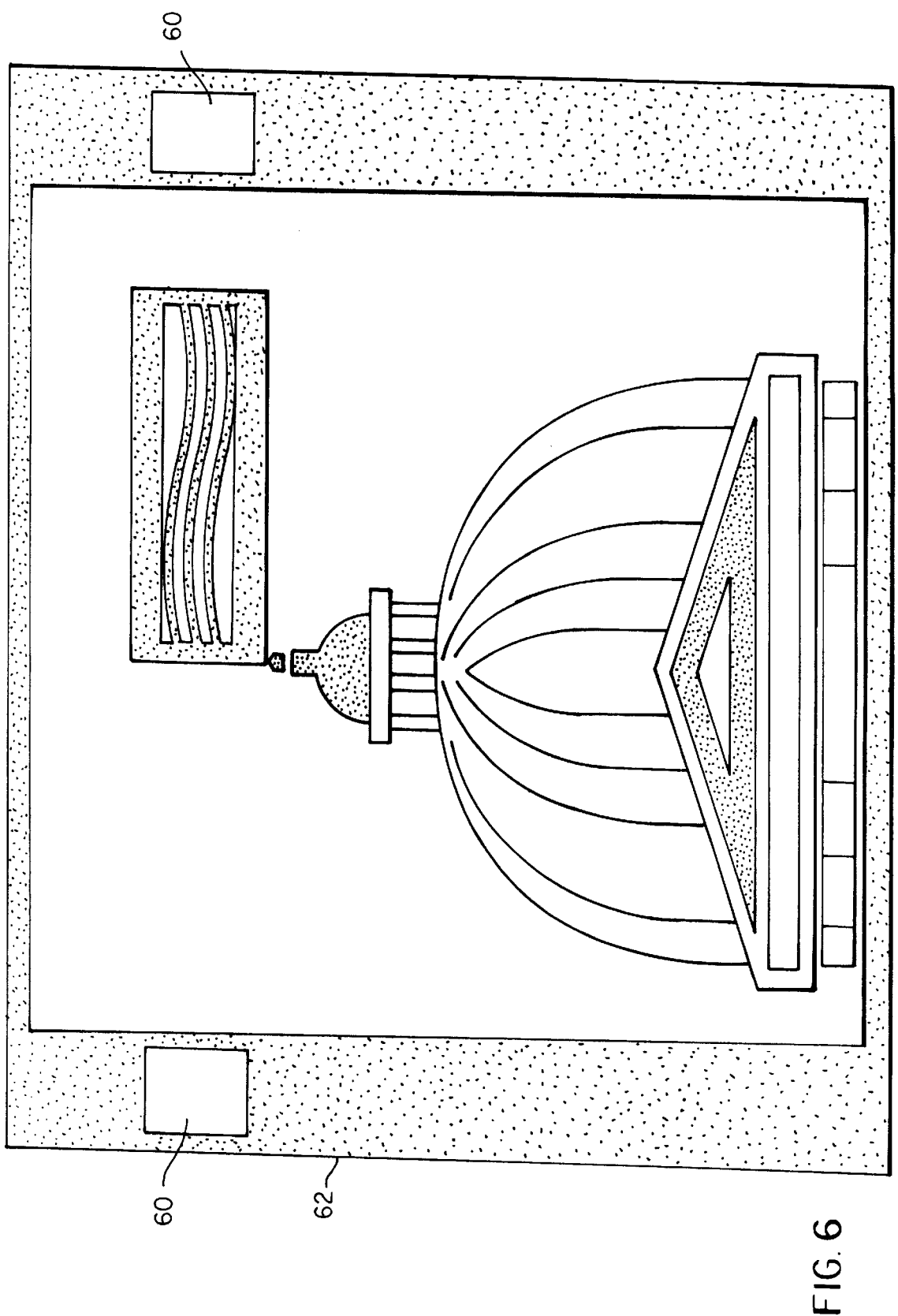
FIG. 6 illustrates a printed photograph, generated in accordance with a second embodiment of the present invention, which includes a dark boarder with white areas used to indicate the location of stored data within the photograph.

As an alternative to adjusting the optical density of the photograph being printed in the audio data region, in accordance with one embodiment of the present invention in step 60, the optical data region is identified by adding a neutral density, e.g., black, boarder 62 to the photograph with white marks, e.g., blocks 60 being located in the boarder 62 to identify the location within the photograph of the audio data region. The result of this method of identifying the audio data is shown in FIG. 6. In this particular embodiment, the need to modify the image the content of the image (optical density) is avoided via the use of a boarder with identifying marks.

Figure 7:
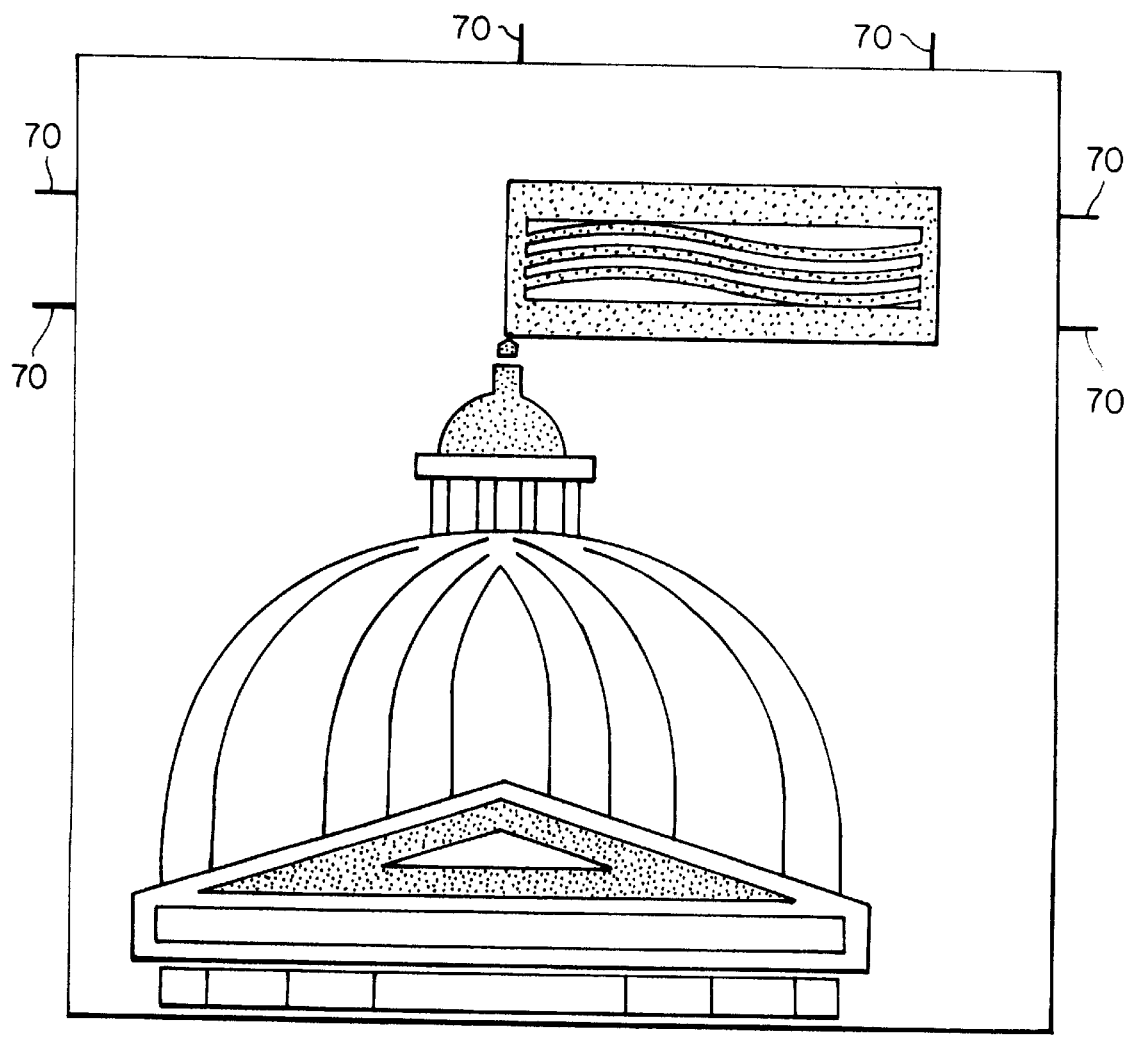
FIG. 7 illustrates a printed photograph, generated in accordance with a third embodiment of the present invention, which includes a white boarder with black lines used to indicate the location of stored data within the photograph.

In yet another embodiment, the result of which is illustrated in FIG. 7, a white boarder with relatively small marks 70 is added to the photograph to identify the presence and placement of printed audio data in the photograph. In such an embodiment, the marks 70 are generated by processing one or more of the data sets representing the rendered color image to add the boarder and audio region identification marks 70.

From step 60, operation proceeds to step 62 wherein the audio data is rendered in memory for printing using the optical data coordinates and spatial information specified in step 56. For rendering and printing purposes, the audio data is treated as simply another two dimensional image, e.g., bar code, to be printed using a different ink. Normally the audio data is printed on top of the colors used to represent the image portion of the photograph being printed. In accordance with the present invention, the rendering of the audio data results in the creation of a set of data in memory 28 that is used to control the printer 34 to print the audio data at the image location corresponding to the audio data region.

After the completion of step 62, the rendered optical and audio data sets are output, in step 50, e.g., to the printer 34. In step 64, the printer 34 prints the image and/or the image is displayed in response to the received data sets. In a CMY printing embodiment, first the cyan is printed using the data set representing the cyan portion of the image being printed. The cyan is followed by the printing of the magenta and yellow portions of the image respectively. Finally, the rendered set of audio data is used to print the audio data. As discussed above, the audio data is printed using invisible or nearly invisible ink selected for this purpose.

In the case of an RGB embodiment, the colors are output in the order red, green, blue, with the audio data being output last.

After the image is printed or displayed in accordance with the present invention, the routine of the present invention stops in step 66, pending the re-starting of the routing 40 and the capture of a new image.

While the methods and apparatus of the present invention have been described in the context of processing audio and image data captured using a digital camera, the image processing and printing methods of the present invention can be used for processing audio and image data files regardless of their source. Furthermore, the methods and apparatus of the present invention can be used for locating, identifying and printing different types of information and not merely audio information on a photograph in a manner that is invisible or largely invisible to the naked eye.

In addition, while the FIG. 1 embodiments shows the image processing system 20 as a separate device located external to the camera 11, in another embodiment, the image processing system 20 is incorporated directly into the camera 11.

What is claimed is:

1. A method of generating a printed image, the method comprising the steps of:
   processing data representing an image to add visible printed data identification indicia to the image by modifying one or more image colors in the identified area of the image to compensate for any effect the printing of the data to be stored will have on the perceived color of the printed image;
   printing both the image including the visible printed data identification indicia and data to be stored on the printed image, the data to be stored being printed in a manner that results in non-visible machine readable data being included on the printed image.

2. The method of claim 1, wherein the step of processing data representing an image to add visible printed data identification indicia to the image includes the step of:
   processing a portion of the image to reduce the optical density of the processed image portion.

3. The method of claim 2, wherein the processed image portion corresponds to at least a portion of an image area in which the data to be stored is to be printed.

4. The method of claim 3, wherein the processing of the portion of the image includes the step of reducing the optical density of the processed image portion by approximately 2–3%.

5. The method of claim 1, wherein the step of processing data representing an image to add visible printed data identification indicia to the image includes the step of:
   processing a portion of the image corresponding to at least a portion of the area in which the data to be stored is to be recorded to brighten the portion of the image being processed.

6. The method of claim 1, wherein the step of processing data representing an image to add visible printed data identification indicia to the image includes the step of:
   adding a boarder to the image; and
   including in the boarder visible marks identifying the location within the printed image of at least a portion of the non-visible machine readable data.

7. The method of claim 6, wherein the boarder is a first color and the visible marks are a second color.

8. The method of claim 7, wherein the first color is black and the second color is white.

9. The method of claim 7, wherein the first color is white and the second color is black.

10. The method of claim 1, wherein the step of processing data representing an image to add visible printed data identification indicia to the image includes the step of:
    adding visible marks identifying the location within the printed image of at least a portion of the non-visible machine readable data.

11. The method of claim 10, wherein the visible marks are added to an outer peripheral portion of the image.

12. The method of claim 1, further comprising the step of:
    determining the size of the area to be used for recording the data to be stored as a function of the amount of data to be stored.

13. The method of claim 12, further comprising the step of:
    identifying an area of the image of the determined size having a high optical density relative to other areas of the image.

14. The method of claim 13, wherein the step of printing the data to be stored includes the step of:
    printing the data to be stored in the identified area.

15. The method of claim 14,
    wherein the data is audio data, and
    wherein the step of processing data representing an image further includes the steps of:
       selecting, as a function of the optical density of the image, a location within the image where the data to be stored is to be printed.

16. A printed image, comprising:
    a printing substrate;
    a first layer of ink representing non-visible machine readable data;
    a layer of visible ink representing an image, the layer of visible ink including visual indicia of the presence of non-visible machine readable data, wherein one or more image colors in the identified area of the image are modified to compensate for any effect printing of the data to be stored will have on the perceived color of the printed image.

17. The printed image of claim 16, wherein the visual indicia of the presence of non-visible machine readable data indicates the location on the printing substrate of at least a portion of the non-visible machine readable data.

18. The printed image of claim 17, wherein the visual indicia of the presence of non-visible machine readable data is a lightened area within the image.

19. The printed image of claim 17, wherein the visual indicia of the presence of non-visible machine readable data are marks in a boarder forming the outside of the image.

20. The printed image of claim 17, wherein the non-visible machine readable data is audio data.

21. The printed image of claim 20, wherein the printed image is a photograph.

22. An apparatus for processing and printing an image and data, the image processing system including:

means for selecting an area within the image to print the data;

means for processing the image to add visual indicia indicating the location of the selected area, wherein one or more image colors in the identified area of the image are modified to compensate for any effect the printing of the data to be stored will have on the perceived color of the printed image; and printing means for printing both the image including the visual indicia of the location in the image of the selected area and for printing the data in the selected area in a manner that renders it invisible to the human eye.

23. The apparatus of claim 22, further comprising:

a digital camera coupled to the selecting and processing means, the digital camera generating the image to be printed from an optical input and generating the data to be printed from an audio input.

* * * * *